UNITED STATES PATENT OFFICE.

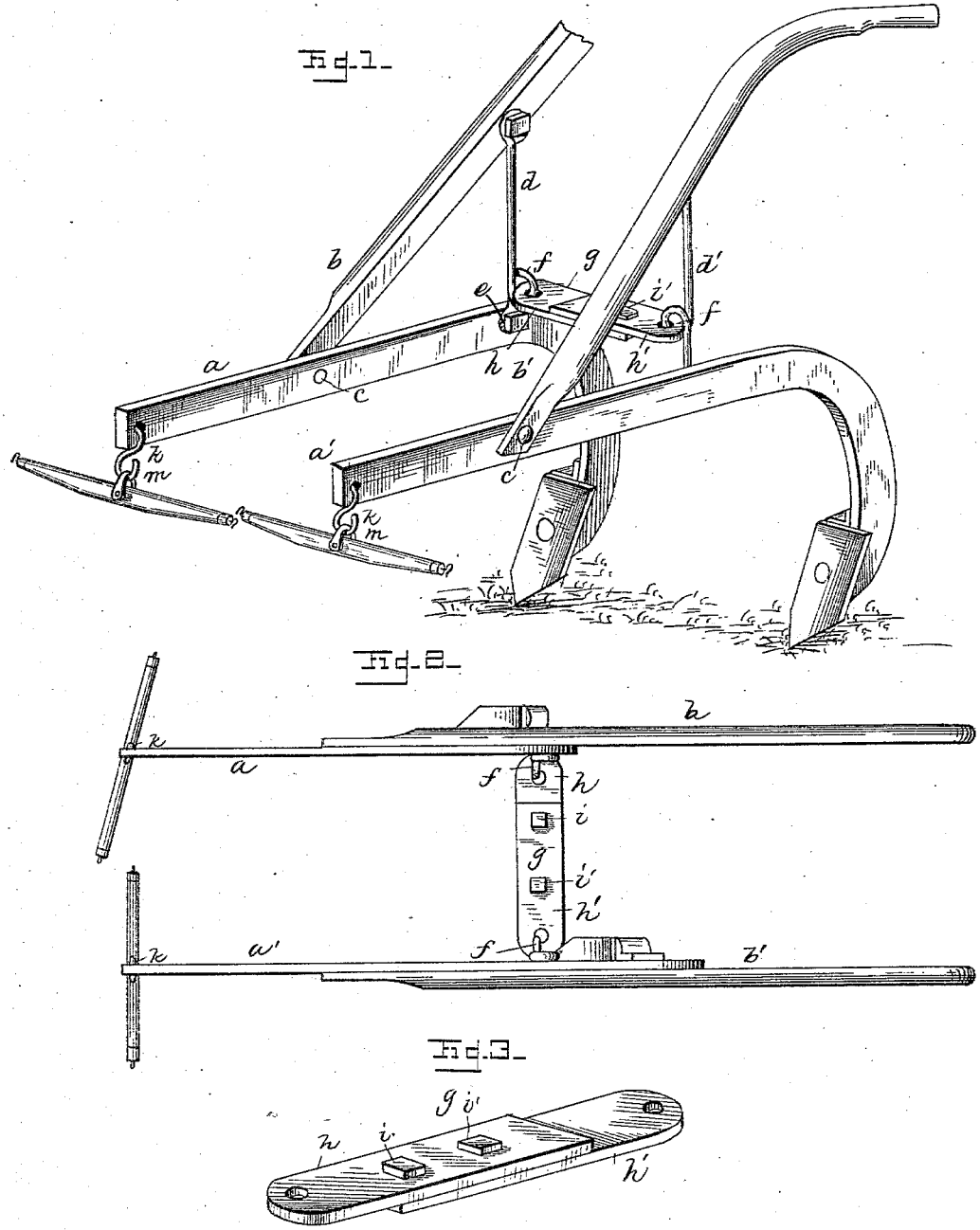

JOSEPH RILEY SALTER, OF QUITMAN, GEORGIA.

CULTIVATOR.

SPECIFICATION forming part of Letters Patent No. 305,851, dated September 30, 1884.

Application filed March 20, 1884. (No model.)

*To all whom it may concern:*

Be it known that I, JOSEPH RILEY SALTER, a citizen of the United States, residing at Quitman, in the county of Brooks and State of Georgia, have invented a new and useful Cultivator, of which the following is a specification, reference being had to the accompanying drawings.

This invention has relation to cultivators; and it consists in the construction and novel arrangement of parts, as will be hereinafter fully described, and particularly pointed out in the claims.

Figure 1 is a view in perspective of a cultivator embodying the improvements of my invention, and Fig. 2 is a plan view of the same. Fig. 3 is a perspective detail view of the adjustable hinged coupler for connecting the cultivator-beams.

Referring by letter to the accompanying drawings, $a$ $a'$ designate the cultivator-beams, which curve downwardly at their rear ends, and are provided with cultivator-teeth of any approved pattern.

$b$ $b'$ designate independent handles, which are connected at their forward ends to the cultivator-beams by bolts and nuts $c$, their rear connections to the cultivator-beams being made by means of brace-rods $d$ $d'$, secured by bolts and nuts, as at $e$. These brace-rods $d$ $d'$ are provided with integral loops $f$ $f$ just above the upper edges of the cultivator-beams, to which are hinged a half-section of the adjustable coupling $g$. The half-sections $h$ $h'$ of the adjustable coupling are either perforated or slotted longitudinally for the reception of the adjusting-bolts $i$ $i'$, and the rods $d$ $d'$ are passed through perforations near the ends of the half-sections $h$ $h'$ of the adjustable coupling $g$ before the loops $f$ $f$ are formed. The forward ends of the cultivator-beams are perforated for the reception of the hooks $k$ on the rear ends of the arms $l$ $l$ of the draft-hook $m$, thereby dispensing with the usual clevis-connection. The adjustable coupling permits the cultivator-teeth to be lifted out of the ground and adjusted independently of each other in case the teeth, or one of them, come in contact with roots, stumps, stones, or brush, and the like, while in the constructions heretofore used all of the cultivator-teeth, or both, where there are two, must be lifted to extricate a single tooth.

In order to make the connection with the draft-hook, the frieze-iron of the single-tree needs only to be slipped upon the hook, thereby dispensing with all clevis-irons.

This cultivator possesses simplicity, ease of adjustment, cheapness, durability, and general efficiency.

Having thus fully described my invention, what I claim as new, and desire to secure by Letters Patent, is—

In a cultivator, the combination, with the independent cultivator-beams, of the handles connected separately to said beams by bolts and nuts, and brace-rods having loops or eyes above the edges of the beams, and the hinged adjustable coupling connecting the brace-rods through their eyes, substantially as specified.

In testimony that I claim the foregoing as my own I have hereto affixed my signature in presence of two witnesses.

JOSEPH RILEY SALTER.

Witnesses:
JAMES D. WADE, Jr.,
JOHN G. McCALL.